May 13, 1958  G. H. MULLER ET AL  2,834,641
MOTOR VEHICLE DRIVELINE MOUNTING

Filed May 31, 1955  3 Sheets-Sheet 1

G. H. MULLER.
W. E. DAVIS.
INVENTORS.

BY E. C. McRae.
J. R. Faulkner.
T. H. Oster.
ATTYS.

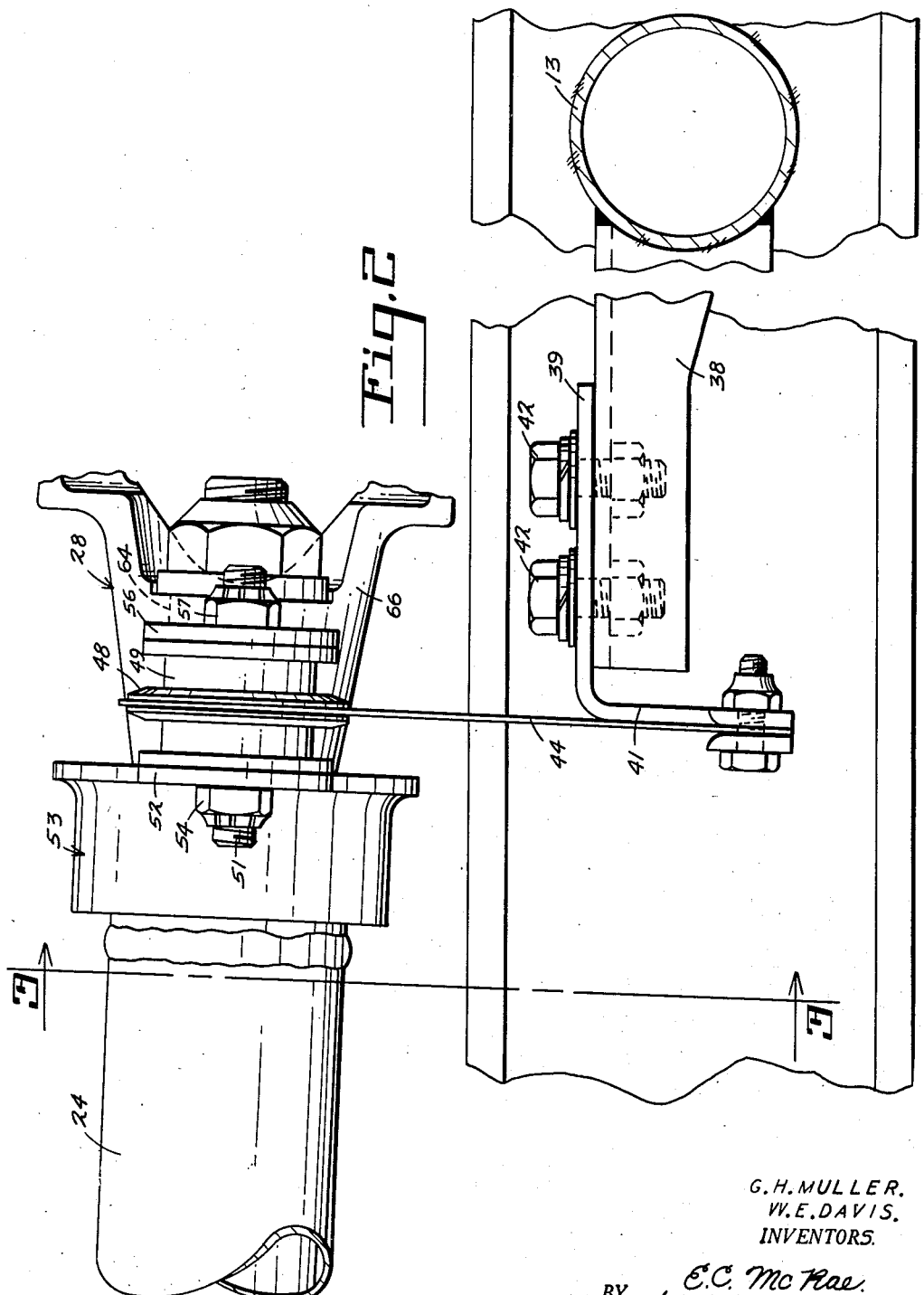

May 13, 1958　　　G. H. MULLER ET AL　　　2,834,641
MOTOR VEHICLE DRIVELINE MOUNTING
Filed May 31, 1955　　　　　　　　　　　3 Sheets-Sheet 3

G. H. MULLER.
W. E. DAVIS.
INVENTORS.

BY E. C. McRae.
J. R. Faulkner.
J. H. Oster.
　　　ATTYS.

United States Patent Office 2,834,641
Patented May 13, 1958

2,834,641

MOTOR VEHICLE DRIVELINE MOUNTING

George H. Muller and William E. Davis, Northville, Mich., assignors to Ford Motor Company, Dearborn, Mich., a corporation of Delaware Application May 31, 1955, Serial No. 512,123

2 Claims. (Cl. 308—28)

This invention relates generally to driveline mountings for motor vehicles.

In motor vehicles incorporating front and rear drive shafts and three universal joints between the engine and the rear axle, it is necessary to provide a mounting adjacent the mid-joint to rotatably support the driveline. This mounting should dampen vibrations originating in the driveline and in addition should accommodate limited axial movement of the driveline resulting from movement of the rear axle and rear springs during vehicle operation. This is accomplished in the present instance by providing a pair of laterally spaced vertically extending flat springs with each of the springs being connected at one end to the vehicle frame and at the opposite end to a bearing housing containing a ball bearing assembly rotatably supporting the vehicle driveline. In the present embodiment the connections of the flat springs to the bearing housing incorporate resilient members located at laterally spaced points on opposite sides of the driveline. The flat springs are capable of flexing to accommodate fore and aft movement of the driveline and the resilient mountings co-operate with the springs in permitting this axial driveline movement and in addition assist in dampening driveline vibrations.

Other objects and advantages of this invention will be made more apparent as this description proceeds, particularly when considered in connection with the accompanying drawings, wherein:

Figure 2 is an enlarged side elevational view of the mid-joint mounting shown in Figure 1.

Figure 3:
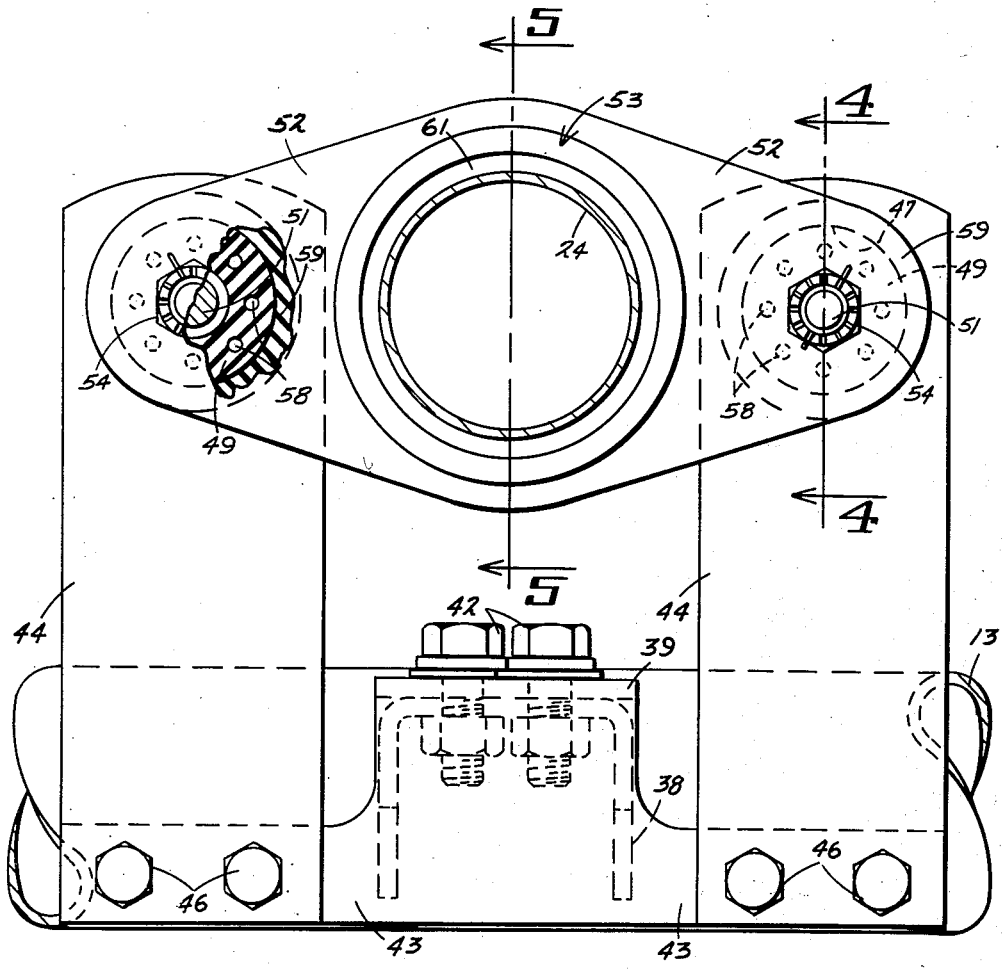
Figure 3 is a front elevational view of the mounting, as viewed on the line 3—3 of Figure 2.
Figure 4:
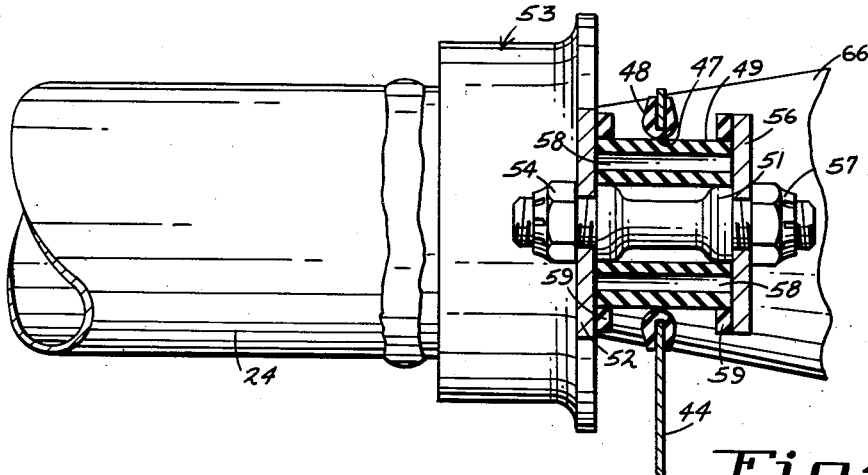
Figure 5:
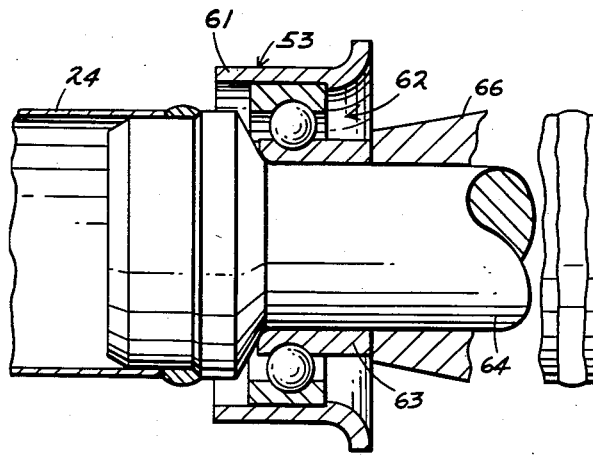

Figures 4 and 5 are vertical cross sectional views taken on the planes indicated on the lines 4—4 and 5—5 of Figure 3.

Figure 6:
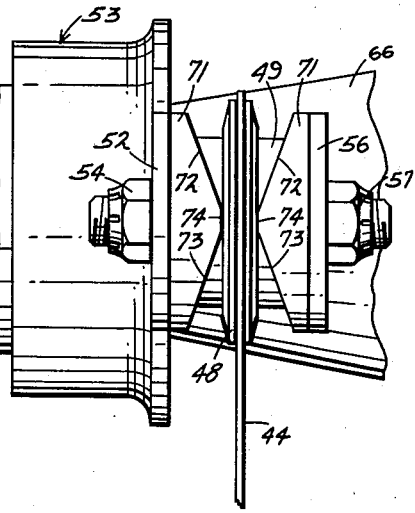

Figure 6 is a fragmentary side elevational view of a modification.

Figure 1:
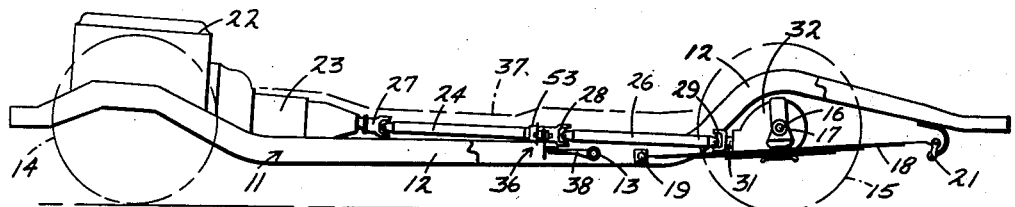
Figure 1 is a side elevational view of a motor vehicle chassis incorporating the present invention.

Referring now to the drawings, and particularly to Figure 1, the reference character 11 indicates generally a motor vehicle frame having a pair of laterally spaced side frame rails 12 and an intermediate tubular cross frame member 13 extending transversely between the side frame rails 12. Front and rear road wheels 14 and 15 are provided, the rear wheels 15 being driven by axle shafts 16 housed within axle tubes 17 and suspended from the vehicle frame by means of longitudinally extending leaf springs 18. The springs 18 are connected to the vehicle side frame rails 12 by means of front and rear spring hangers 19 and 21 respectively, and are interconnected intermediate their ends to the axle tubes 17.

The rear road wheels are driven by a power train including an engine 22, transmission 23, and front and rear drive shafts 24 and 26 respectively. A universal joint 27 interconnects the transmission and the front drive shaft 24, while a second universal joint 28 interconnects the front and rear drive shafts 24 and 26. The rear drive shaft 26 drives through a third universal joint 29 to a pinion shaft 31 journaled in the rear axle housing 32 and operatively connected by means of a conventional differential gearing (not shown) to the rear axle shafts 16.

A mid-joint mounting 36 is provided, to rotatably support the rearward end of the front drive shaft 24 adjacent the universal joint 28, to permit the floor tunnel 37 to be relatively low in height. The mid-joint mount 36 is more fully shown in Figures 2 to 5 inclusive.

An inverted channel shaped mounting bracket 38 is welded at its rearward end to the tubular cross frame member 13 and extends forwardly therefrom generally in alignment with the longitudinal axis of the vehicle. At its forward end the mounting bracket 38 supports the upper flange 39 of an L-shaped bracket 41, the latter being secured thereto by means of bolts 42. As best seen in Figure 3, the L-shaped bracket 41 has laterally extending side flanges 43 projecting in opposite directions therefrom.

A pair of flat springs 44 are provided, each being secured at its lower end to one of the side flanges 43 of the L-shaped bracket 41 by means of bolts 46. The flat springs 44 lie in a common plane extending transversely of the vehicle and at right angles to the fore and aft centerline of the vehicle. They are parallel to each other, extending vertically upwardly from the bracket 41. At their upper ends the flat springs 44 are located on opposite sides of the front drive shaft 24, and are formed with circular openings 47 therein. The openings 47 are embraced by bearing rings 48 generally U-shaped in cross section.

Each bearing ring 48 is sleeved over the periphery of an annular rubber bushing 49 which in turn is supported upon a shouldered stud 51 carried by a side flange 52 of the bearing housing 53. The shouldered stud 51 is secured to the side flange 52 of the bearing housing by means of a nut 54, and also supports at its opposite end a flat washer 56 held thereon by means of a nut 57. The side flange 52 and the flat washer 56 engage the opposite ends of the annular rubber bushing 49. The rubber bushing 49 is formed with a series of axially extending openings 58 therethrough to afford added resiliency to the bushing. A pair of annular rubber rings 59 are mounted upon the periphery of the rubber bushing 49 adjacent the side flange 52 and washer 56.

The bearing housing 53 is integrally formed with an axially extending sleeve portion 61 containing a ball bearing assembly 62 having an inner race 63 mounted upon the front drive shaft extension 64. This extension is welded to the rearward end of the front drive shaft and supports the front yoke 66 of the mid-joint 28.

It will be apparent from the foregoing that the springs 44 may flex longitudinally to allow the necessary fore and aft movement of the front drive shaft 24 which may result from vertical movement of the rear axle and the leaf springs during vehicle operation as well as distortion and windup of the springs 18. The resilient bushings 49 co-operate with the springs 44 in accommodating the axial movement of the drive shaft, and in addition dampen driveline vibrations. The bearing ring 48 carried by the flat spring 44 prevents undue wear between the spring and the bushing and facilitates the necessary angular movement therebetween during axial movement of the drive shaft.

In a modification of the invention, as shown in Figure 6, rubber rings 71 are sleeved upon the rubber bushing 49 between the side flange 52 of the bearing housing and the washer 56. The annular rings 71 have opposed tapered end portions 72 and 73 angularly related to each other and forming therebetween a vertex 74 engaging the adjacent portion of the bearing ring 48 carried by the flat spring 44. It will be noted that the tapered surfaces 72 and 73 are arranged so that their vertices 74 are in a common horizontal plane at opposite sides of the bushing 49 to form fulcrums for the bearing ring 48 during the fore and aft movement of the front drive shaft. During this axial movement of the drive shaft the flat springs 44 flex in either a fore or aft movement and the bearing rings 48 fulcrum about the vertices 74 with the tapered portions 72 and 73 of the rings 71 providing clearance for this movement as well as forming stop therefor.

The rings 71 may also be molded integrally with the bushing forming a one-piece bushing design.

It will be understood that the invention is not to be limited to the exact construction shown and described, but that various changes and modifications may be made without departing from the spirit and scope of the invention, as defined in the appended claims.

What is claimed is:

1. In a motor vehicle, a frame member, a driveline, a bearing housing having a vertical plate portion extending laterally of said vehicle and an annular ring portion embracing the vehicle driveline, a bearing assembly mounted within said ring portion and rotatably supporting said driveline, a pair of axially extending studs carried by said bearing housing on the laterally opposite sides of said driveline, resilient bushings having cylindrical outer surfaces mounted upon said studs, and a pair of flat spring members extending generally vertically and equally spaced on opposite sides of a vertical plane containing the axis of said driveline, said flat spring members being rigidly connected at their lower ends to said frame member and at their upper ends being apertured to receive and embrace the cylindrical outer surfaces of said bushings intermediate the ends of the latter, said spring members being flexible in a direction longitudinally of the vehicle frame to permit limited axial movement of said bearing housing and bearing assembly.

2. The structure defined by claim 1 which is further characterized in that a pair of opposed rings are sleeved over each of said bushings, each of said rings having opposed portions projecting toward the apertured upper end of the adjacent flat spring member with the projecting portions being located on opposite sides of said bushings substantially in horizontal alignment with the axes of said bushings.

References Cited in the file of this patent

UNITED STATES PATENTS

| | | |
|---|---|---|
| 2,465,785 | Berno | March 29, 1949 |
| 2,560,759 | Evernden et al. | July 17, 1951 |
| 2,682,434 | Guy | June 29, 1954 |